United States Patent [19]

Ousterhout

[11] 4,320,581
[45] Mar. 23, 1982

[54] LEVELING

[75] Inventor: Karl B. Ousterhout, Kosciusko, Miss.

[73] Assignee: Potomac Applied Mechanics, Inc., Bethesda, Md.

[21] Appl. No.: 154,296

[22] Filed: May 29, 1980

[51] Int. Cl.³ .............................................. G01C 9/28
[52] U.S. Cl. ..................................................... 33/388
[58] Field of Search ................................. 33/385–388

[56] References Cited

U.S. PATENT DOCUMENTS

| | | |
|---|---|---|
| 306,429 | 10/1884 | Rich . |
| 785,581 | 3/1905 | Shorts . |
| 1,159,516 | 11/1915 | Machin et al. . |
| 1,215,035 | 2/1917 | Kocisko . |
| 1,802,131 | 4/1931 | Wright .................................. 33/388 |
| 2,439,698 | 4/1948 | Shaler . |
| 2,692,440 | 10/1954 | Walters . |
| 2,805,480 | 9/1957 | Sparks . |
| 2,906,032 | 9/1959 | Holderer . |

FOREIGN PATENT DOCUMENTS 172312  2/1952  Austria .

*Primary Examiner*—Charles E. Phillips
*Attorney, Agent, or Firm*—Cushman, Darby & Cushman

[57] ABSTRACT

A level mechanism, and a method of utilization thereof, are disclosed that provide for completely accurate angular placement of workpieces in operative association with the machine tool in a simple manner, even if the machine tool work surface is not itself level. A frame is provided having an elongated straight edge portion, a spirit level tube, a first annular member having first indicia formed thereon, and a second annular member having second indicia formed thereon. Actuators are associated with each of the annular members. A mounting mechanism is provided for mounting the level tube with respect to the annular members, and for mounting the annular members with respect to the frame, so that both annular members are rotatable about a common axis perpendicular to the frame straight edge, and the level tube and the second annular member rotate with the first annular member when it is rotated, and rotate with each other but not the first annular member when the actuator for the first annular member is rotated.

14 Claims, 6 Drawing Figures

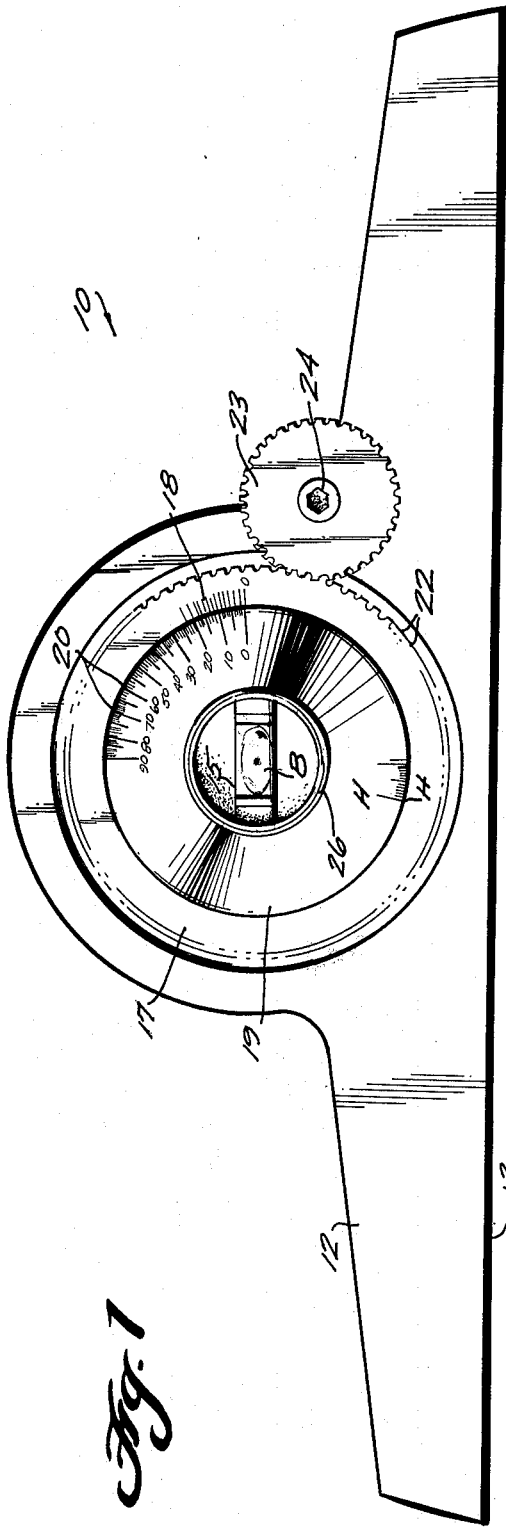
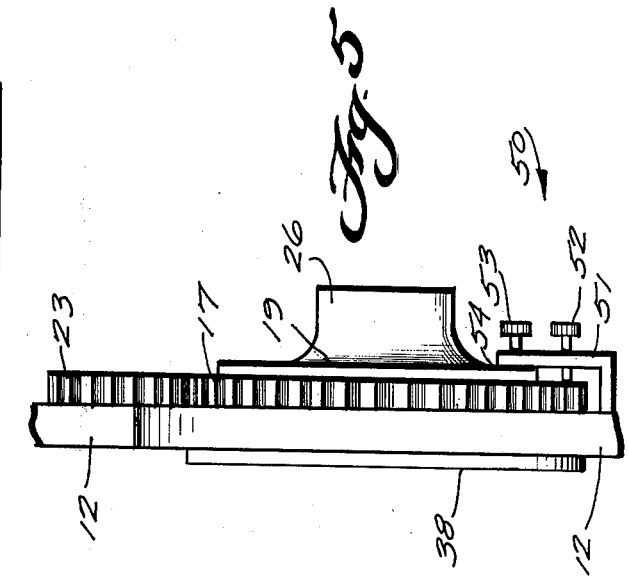
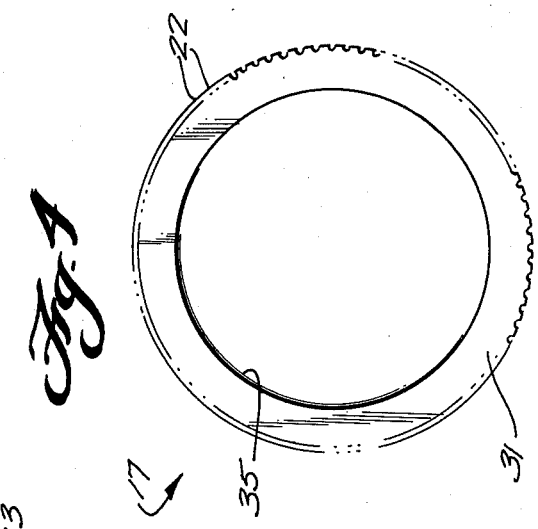
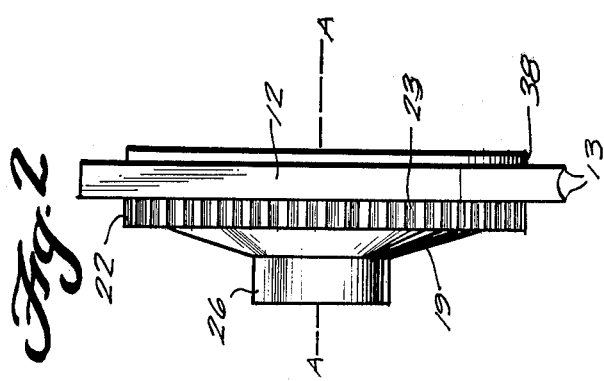

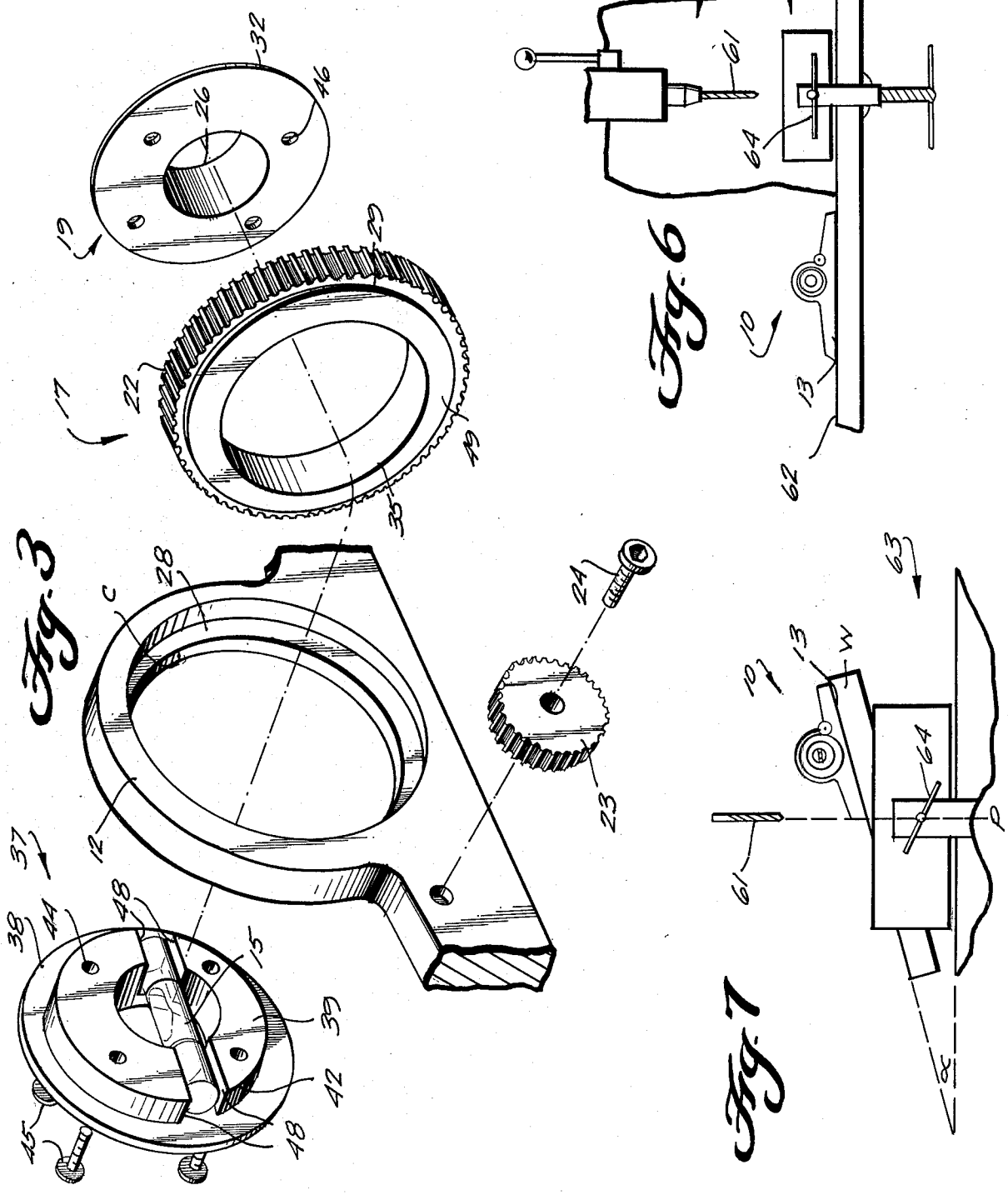

LEVELING

BACKGROUND AND SUMMARY OF THE INVENTION

There are a wide variety of available level mechanisms for indicating when a surface on which a straight edge of the level mechanism is placed is horizontal, and allowing relative rotation between a level tube of the level mechanism and the level mechanism frame to provide any desired angular orientation therebetween. See U.S. Pat. No. 2,692,440 (the disclosure of which is hereby incorporated by reference herein). While such level mechanisms are useful, they have some limitations, especially in the machine tool environment. For instance, in utilizing such conventional level mechanisms to orient a workpiece with respect to a drill press, or the like, with a predetermined annular relationship between the drill press and workpiece being desired, if the work surface for the drill press is not truly horizontal the workpiece will be improperly positioned if the degree indicia on the level mechanism are relied upon. Therefore, a complicated procedure must be gone through to take into account the particular amount that the machine tool working surface deviates from the horizontal, otherwise the proper annular orientation of the workpiece with respect to the drill press wil not be achieved.

According to the present invention a level mechanism is provided that overcomes the drawbacks inherent in prior level mechanisms, especially in the machine tool environment. By utilizing the level mechanism according to the present invention, and practicing the method of setting up a workpiece with respect to the machine tool, it is possible to accurately positively position a workpiece with respect to a machine tool at a desired angular orientation in a simple manner.

The level mechanism according to the present invention comprises a frame including an elongated straight edge portion; a spirit level tube; a first annular member having first indicia formed thereon; a second annular member having second indicia formed thereon for cooperation with the first indicia; first actuator means for grasping to effect rotation of the first annular member; and second actuator means distinct from the first actuator means for grasping to effect rotation of the second annular member. The level mechanism further includes means for mounting the level tube with respect to the first and second annular members and for mounting the first and second annular members with respect to the frame, so that the first annular member is rotatable (about an axis perpendicular to the straight edge) with respect to the frame with the second annular member and the level tube being rotatable therewith upon actuation of the first actuator means, so that no relative movement between the first and second indicia takes place but the operative orientation of the level tube with respect to the frame straight edges changes; and so that the level tube is rotatable (about the same axis) with respect to the first annular member upon actuation of the second actuator means, so that relative movement between the first and second indicia takes place and the operative orientation of the level tube with respect to the frame straight edge changes; so that the level tube is readable.

The means for mounting the level tube with respect to the first and second annular members in the frame includes defining a circular bore in the frame perpendicular to the direction of elongation of the straight edge and coaxial with the axis of rotation of the annular members and having a first bearing surface; means defining a second bearing surface on the first annular member for operatively engaging the first bearing surface; means for defining a third bearing surface on the first annular member; and means defining a fourth bearing surface on the second annular member for operatively engaging the third bearing surface. The mounting means further comprises a level tube mounting mechanism including a hub portion for extending into the frame circular bore and constructed so that some operative engagement between the first annular member and the hub takes place so that they may rotate together when the first actuator means is actuated; and means for rigidly fixing the second annular member to the level tube mounting mechanism. The level tube mounting means includes a rim portion having a diameter larger than the diameter of bore, and the means for fixing the second annular member to the level tube mounting mechanism includes a plurality of screws passing through the bore from the level tube mounting means rim to the second annular member to threadably engage the same.

The straight edge preferably has an involute curve configuration along the length thereof. The first annular member preferably has gear teeth formed along the exterior periphery thereof and the first actuating means comprises a gear member operatively mounted to the frame for rotative movement with respect thereto and operatively engaging the gear teeth of the first annular member. The second actuator means comprises a tubular member standing proud of the second annular member with the spirit level tube being readable through the tubular member. The second indicia preferably comprises indicia markings corresponding to each degree from 1 to 90 degrees along the periphery of a quadrant of the second annular member, and the first indicia means preferably comprise a vernier disposed along a portion of the first annular member for cooperation with the second indicia means, one indicia line on the vernier scale being parallel to the straight edge. Further, if desired, locking means may be provided for locking the first annular member in a particular position to which it has been rotated with respect to the frame, and locking means maybe provided locking the second annular in a particular position to which it has been rotated with respect to the frame.

According to another aspect of the present invention, a level mechanism is provided comprising a frame having an elongated straight edge and a circular bore extending therethrough having an axis perpendicular to the straight edge; a first annular member mounted coaxially with the bore and received at least in part within the bore; a second annular member coaxial with the first annular member and received at least in part within the first annular member; and the spirit level tube. A mechanism further comprises a third annular member coaxial with the bore and having a rim portion and a hub portion standing proud from the rim portion, the hub portion received at least in part within the first annular member and the bore and supporting the level tube, and the rim portion having a diameter larger than the diameter of the circular bore, the rim portion abutting the frame. A plurality of fasteners are provided for affixing the third annular member to the second annular member.

A method according to the present invention for setting up a workpiece for a machine tool or the like having a generally horizontal work surface is provided, utilizing a level mechanism including a spirit level tube which indicates the coincidence with the horizontal of a straight edge of the level mechanism. The method comprises the following steps: Placing the mechanism straight edge on the machine tool work surface. Adjusting the angular orientation of the level tube with respect to the mechanism straight edge until the level tube bubble is centered, centering being at a first position. Rotating the level tube with respect to the mechanism straight edge an angle a from the first position, the angle a corresponding to the desired angular orientation of a workpiece with respect to a horizontal. Placing the mechanism straight edge on the workpiece; and adjusting the position of the workpiece until the level tube bubble is centered without changing the angular orientation of the level tube with respect to mechanism straight edge, and maintaining the workpiece in place once the level bubble is centered. The machine tool preferably is a drill press having a generally vertically extending drill bit path of movement (the drill bit path of movement being perpendicular to the work surface of the drill press) and the workpiece maintaining step is preferably practiced by clamping the workpiece in place with a vise.

It is the primary object of the present invention to provide a level mechanism and method of utilization thereof that provide for accurate positioning of a workpiece with respect to a machine tool in a simple manner, even if the machine tool work surface is not completely horizontal. This and other objects of the invention will become clear from an inspection of the detailed description of the invention, and from the appended claims.

BRIEF DESCRIPTION OF THE DRAWINGS

FIG. 1 is a front view of an exemplary level mechanism according to the present invention;

FIG. 2 is a side view of the mechanism of FIG. 1;

FIG. 3 is an exploded perspective view illustrating the operative components of FIG. 1;

FIG. 4 is a front view of the first annular member of the mechanism of FIG. 1;

FIG. 5 is a top plan view of a modified form of the level mechanism according to the present invention; and FIGS. 6 and 7 are schematic views illustrating the utilization of the mechanism of FIG. 1 for properly positioning a workpiece at a particular angular orientation with respect to a machine tool.

DETAILED DESCRIPTION OF THE DRAWINGS

An exemplary level mechanism according to the present invention is illustrated generally at 10 in the drawings. Major components of the level mechanism 10 include a frame 12 having an elongated straight edge 13 (which preferably has an involute curve configuration along the length thereof—see FIG. 2), a spirit level tube 15, a first annular member 17 having indicia 18 formed thereon and a second annular member 19 having indicia 20 formed thereon for cooperation with the first indicia 18. As illustrated most clearly in FIG. 1, the indicia 20 preferably comprises indicia markings corresponding to each degree from 1 to 90° along the periphery of a quadrant of the second annular member 19 and the first indicia means 18 comprises a vernier scale disposed along a portion of the first annular member 17 for cooperation with the indicia 20, one indicia line (indicated "0" in FIG. 1) of the vernier scale being parallel to the straight edge 18 when indicia H-H on the first annular member 17 and frame member 12 are in alignment.

The level mechanism 10 further includes first actuator means for grasping (as with an operator's fingers) to effect rotation of the first annular member 17, and second actuator means distinct from the first actuator means for grasping (as with an operator's fingers) to effect rotation of the second annular member 19. In the embodiment illustrated in the drawings, the first annular member 17 has gear teeth 22 formed along the periphery thereof, and the first actuator means comprises a gear wheel 23 mounted to the frame 12 for rotative movement with respect thereto and operatively engaging the gear teeth 22 on the first annular member 17. A threaded bore (see FIG. 3) in frame member 12 receives a screw fastener 24 with a head adapted to receive an Allen wrench to provide for rotative mounting of the gear wheel 23 with respect to the frame 12. In the embodiment illustrated in the drawings, the second actuator means comprises a tubular member 26 standing proud of the second annular member 19, with the spirit level tube being readable through the tubular member 26.

The level mechanism further comprises means for mounting the level tube 15 with respect to the annular members 17, 19, and for mounting the member 17, 19 with respect to frame 12 so that the member 17 is rotatable about axis A—A perpendicular to straight edge 13, with respect to the frame 12 and with the member 19 and level tube 15 being rotatable therewith, upon actuation of the gear wheel 23, so that no relative movement between the indicia 18, 20 takes place but the operative orientation of the tube 15 with respect to edge 13 changes; and so that the member 19 and the tube 15 are rotatable about axis A—A with respect to the member 17 upon actuation of the tubular member 26 so that relative movement between the indicia 18, 20 takes place and the operative orientation of the tube 15 with respect to edge 13 changes. The tube 15 is also mounted so that it is readable (as by viewing through tubular member 26). In the embodiment of the invention illustrated in the drawings, such mounting means include means defining a circular bore C (see FIG. 3) in the frame 12 perpendicular to the edge 13 (and coaxial with axis A—A), and having a first bearing surface 28; means defining a second bearing surface 29 on member 17 for operatively engaging surface 28, and means defining a third bearing surface 31 (see FIG. 4) on member 17; and means defining a fourth bearing surface 32 (see FIG. 3) on the member 19 for operatively engaging the surface 31. A core portion of annular member 19 stands proud of the surface 32 and is adapted to be received by the interior periphery 35 of the member 17. The mounting mechanism further comprises a level tube mounting mechanism 37 including a rim portion 38 and a hub portion 39. The hub portion 39 is dimensioned to extend into the bore C, and is further constructed so that some operative engagement between it and the member 17 takes place so that members 37 and 17 may rotate together when the gear wheel 23 is actuated; and means for rigidly affixing the member 17 to the mounting mechanism 37 (which comprises a third annular member). The affixing means comprises a plurality of bores 44 extending through the third annular member 37, as indicated in FIG. 3, a plurality of screws 45 (which preferably have heads adapted to receive an Allen wrench), and a plurality of threaded openings 46 formed in the core 33 of member 19 to threadably receive the screws 35. The outer peripheral surface 42 of the hub portion 39 of member 37 preferably has substantially the same diameter as the internal diameter of the member 17 so that the surfaces 42, 35 will have some frictional engagement therebetween so that they may rotate together when the member 17 is rotated, but not enough frictional engagement to cause rotation together when the members 19 and 37 (which are tied together with screws 45) are rotated.

As illustrated in FIG. 3, the spirit level tube 15 (which preferably is a precision level tube) is frictionally received by surface portions 48 of the hub portion 39 of third annular member 37. Also note that the diameter of rim 38 is greater than the diameter of bore C so that rim 38 abuts the frame member 12 when the device 10 is assembled (see FIG. 2).

Frictional engagement between surfaces 32 and 35, 32 and 31, and 49 and rim 38 are sufficient to effect coincident rotation of members 17 and 19 when actuator 23 is actuated. However, if desired, a releasable locking mechanism could be provided between elements 17 and 19. Additionally, if such frictional engagement were not to be relied upon, a locking mechanism could be provided for locking member 19 to frame 12 once it had been moved to a desired position, and a locking mechanism could be provided for locking member 17 to frame 12 if the inertia provided by gear wheel 23, and the frictional engagement between surfaces 29 and 28 were not to be relied upon to maintain the position of member 17 with respect to frame 12. A typical type of locking mechanism that could be utilized is illustrated in U.S. Pat. No. 306,429, the disclosure of which is whereby incorporated by reference herein, and another exemplary type of locking mechanism is illustrated generally at 50 in FIG. 5. The locking mechanism 50 includes an arm 51 rigidly attached at one end thereof to frame 12 and extending over members 17 and 19, and having a pair of locking screws 52, 53 threadably received thereby. Locking screw 52 may be tightened down to frictionally engage surface 31 of first annular member 17 to prevent relative rotation between it and the frame 12, and screw 53 may be tightened down to engage a flattened surface portion 54 of second annular member 19 to prevent relative rotation between it and the frame member 12.

Of course, other variations of the level mechanism 10 also may be provided. For instance, the gear wheel 23 may be constructed to that it is operated by an accessory actuator button cooperating with particularly graduated indicia on the frame 12, as illustrated in U.S. Pat. No. 2,692,440; and, more than one straight edge may be provided for the frame mechanism 12, such as a straight edge perpendicular to the edge 13.

An exemplary method according to the present invention utilizing the mechanism 10 is illustrated schematically in FIGS. 6 and 7. The method is for setting up a workpiece W for a machine tool 60 or the like (illustrated in the drawings as a drill press having a drill bit 61) having a generally horizontal work surface 62. The path of movement P (see FIG. 7) of the drill bit 61 is perpendicular to the work surface 62, however, the work surface 62 is not necessarily completely horizontal. For instance in FIG. 6, the horizontal is indicated as H', the work surface 62 deviating an angle $\beta$ from the horizontal H'. Unless this angular deviation is taken into account, holes to be drilled with the drill bit 61 will not have the desired orientation.

In utilizing the mechanism 10, the "0" points on the indicia 18, 20 are aligned (see FIG. 1), and the edge 13 is placed on the work surface 62. The gear wheel 23 is then rotated, which in turn rotates first annular member 17, until the bubble B is centered in the level tube 15. If indicia marks H on the member 17 and frame 12 (see FIG. 1) line up at that position, then the work surface 62 is completely horizontal, but typically they will be displaced somewhat. If a locking mechanism 50 is associated with the device 10, at this point the locking screw 52 is tightened down to positively hold the member 17 in the relative position to which it has been moved with respect to frame 12.

After leveling tube 15 with respect to work surface 62, the desired angular orientation $\alpha$ (see FIG. 7) that the workpiece W is to have with respect to the work surface 62 is provided between the indicia 18 and 20. That is, by grasping member 26 the second annular member 19 with level tube 15 is rotated with respect to first annular member 17, so that the desired "$\alpha$" reading on indicia 20 lines up with the "0" mark on indicia 18. In FIG. 7 $\alpha$ is drawn to be about 17°, therefor to achieve that orientation the 17° mark on scale 20 would be aligned with the "0" mark on scale 18. The workpiece W is then disposed between the jaws of the vise 63 at approximately the desired angular orientation, and the edge 13 of mechanism 10 is placed on the workpiece W, as illustrated in FIG. 7. The position of the workpiece W is then adjusted (as by tapping it slightly to re-orient it with respect to surface 62, the re-orienting being allowed by the loose clamping by the jaws of the vise 63) until the level tube bubble B is centered. During this time, the angular orientation of the level tube 15 with respect to edge 13 is not changed, and in a device 10 having a locking mechanism 50 this is ensured by tightening down the locking screw 53 into locking engagement with surface 54 of second annular member 19. Once the bubble B is centered with edge 13 on the workpiece W, the workpiece is maintained in this position, as by rotating handle 64 of the clamping screw for the vise 63 to vise-clamp the workpiece W in place. Then the drill press 60 may be operated to bring the drill bit 61 into engagement with workpiece W and a hole will be drilled having exactly the desired angular relationship with respect to the workpiece W.

It will thus be seen that according to the present invention a leveling mechanism, and a method of setting up a workpiece for a machine tool, have been provided having numerous advantages over the prior art and accuracy and simplicity of operation. While the invention has been herein shown and described in what is presently conceived to be the most practical and preferred embodiment thereof, it will be apparent to those of ordinary skill in the art that many modification may be made thereof within the scope of the invention, which scope is to be accorded the broadest interpretation of the appended claims so as to encompass all equivalent structures and methods.

What is claimed is:
1. A level machanism comprising
a frame including an elongated straight edge portion;
a spirit level tube;
a first annular member having first indicia formed thereon;
a second annular member having second indicia formed thereon;

first actuator means for grasping to effect rotation of said first annular member;

second actuator means distinct from said first actuator means for grasping to effect rotation of said second annular member; and means for mounting said level tube with respect to said first and second annular members and for mounting said first and second annular members with respect to said frame, so that said first annular member is rotatable about an axis perpendicular to said straight edge with respect to said frame with said second annular member and said level tube being rotatable therewith upon actuation of said first actuator means, so that no relative movement between said first and second indicia takes place but the operative orientation of said level tube with respect to said frame straight edge changes; and so that said second annular member and said level tube are rotatable about said axis with respect to said first annular member upon actuation of said second actuator means, so that relative movement between said first and second indicia takes place and the operative orientation of said level tube with respect to said frame straight edge changes; and so that said level tube is readable.

2. A level as recited in claim 1 wherein said straight edge has an involute curve configuration along the length thereof.

3. A level mechanism as recited in claim 1 wherein said means for mounting said level tube with respect to said first and second annular members and said frame comprises:

means defining a circular bore in said frame perpendicular to the direction of elongation of said straight edge and coaxial with said axis, and having a first bearing surface;

means defining a second bearing surface on said first annular member for operatively engaging said first bearing surface, and means defining a third bearing surface on said first member;

means defining a fourth bearing surface on said second annular member for operatively engaging said third bearing surface;

a level tube mounting mechanism including a hub portion for extending into said frame circular bore and constructed so that some operative engagement between said first annular member and said hub takes place so that they may rotate together when said first actuator means is actuated; and means for rigidly affixing said second annular member to said level tube mounting mechanism.

4. A level mechanism as recited in claim 3 wherein said hub portion has an outside diameter substantially the same as the inside diameter of said first annular member so that there is some frictional engagement between the outer periphery of said hub portion and the interior periphery of said first annular member.

5. A level mechanism as recited in claims 3 or 4 wherein said level tube mounting means includes a rim portion having a diameter larger than the diameter of said frame bore, and wherein said means for affixing said second annular member to said level tube mounting mechanism comprises a plurality of screws passing through said bore from said level tube mounting means rim to said second annular member to threadably engage same.

6. A level mechanism as recited in claims 1 or 3 wherein said first annular member has gear teeth formed along the exterior periphery thereof, and wherein said first actuating means comprises a gear member mounted to said frame and for rotative movement with respect thereto and operatively engaging the gear teeth on said first annular member.

7. A level mechanism as recited in claim 6 wherein said second actuator means comprises a tubular member standing proud of said second annular member, said spirit level tube being readable through said tubular member.

8. A level mechanism as recited in claims 1 or 3 wherein said second indicia means comprise indicia markings corresponding to each degree from 1 to 90 degrees along the periphery of a quadrant of said second annular member.

9. A level mechanism as recited in claim 8 wherein said first indicia means comprise a vernier scale disposed along a portion of said first annular member for cooperation with said second indicia means.

10. A level mechanism as recited in claim 1 further comprising locking means for locking said first annular member in a particular position to which it has been rotated with respect to said frame.

11. A level mechanism as recited in claims 1 or 8 further comprising locking means for locking said second annular member in a particular position to which it has been rotated with respect to said frame member.

12. A level mechanism as recited in claim 1 wherein said second actuator means comprises a tubular member standing proud of said second annular member, said spirit level tube being readable through said tubular member.

13. A level mechanism comprising a frame including an elongated straight edge and a circular bore extending therethrough having an axis perpendicular to said straight edge; a first annular member mounted coaxially with said bore and received at least in part within said bore; a second annular member coaxial with said first annular member and received at least in part within said first annular member; a spirit level tube; a third annular member coaxial with said bore and having a rim portion and a hub portion standing proud from said rim portion, said hub portion received at least in part within said first annular member and said bore and supporting said level tube, and said rim portion having a diameter larger than the diameter of said circular bore, and said rim portion abutting said frame; and a plurality of fasteners for affixing said third annular member to said second annular member.

14. A level mechanism as recited in claim 13 wherein the outside diameter of said third annular member hub portion is substantially the same as the inside diameter of said first annular member so that the peripheral portions of said first and third annular members frictionally engage each other to assist in providing some coincident rotation with each other when said first annular member is rotated, but so that said first and third annular members will rotate with respect to each other when said second annular member is rotated.

* * * * *